United States Patent
Göbel et al.

(10) Patent No.: US 6,684,628 B2
(45) Date of Patent: Feb. 3, 2004

(54) PROCESS FOR CHECKING THE OPERATABILITY OF A NITROGEN OXIDE STORAGE CATALYST

(75) Inventors: Ulrich Göbel, Hattersheim (DE); Lutz Marc Ruwisch, Darmstadt (DE); Egbert Lox, Hanau (DE); Thomas Kreuzer, Karben (DE)

(73) Assignee: DMC2 DeGussa Metals Catalysts Cerdec AG, Frankfurt am Main (DE)

( * ) Notice: Subject to any disclaimer, the term of this patent is extended or adjusted under 35 U.S.C. 154(b) by 0 days.

(21) Appl. No.: 09/832,332

(22) Filed: Apr. 11, 2001

(65) Prior Publication Data
US 2002/0012623 A1 Jan. 31, 2002

(30) Foreign Application Priority Data
Apr. 11, 2000 (DE) .......................... 100 17 940

(51) Int. Cl.[7] ................................. F01N 3/00
(52) U.S. Cl. .............. 60/277; 60/274; 60/276; 60/295; 60/297
(58) Field of Search .................. 60/274, 276, 277, 60/285, 295, 297, 301

(56) References Cited

U.S. PATENT DOCUMENTS

| | | | | |
|---|---|---|---|---|
| 5,426,934 A | | 6/1995 | Hunt et al. | |
| 5,437,153 A | * | 8/1995 | Takeshima et al. | 60/276 |
| 5,740,669 A | * | 4/1998 | Kinugasa et al. | 60/285 |
| 5,771,686 A | * | 6/1998 | Pischinger et al. | 60/274 |
| 6,161,378 A | * | 12/2000 | Hanaoka et al. | 60/286 |
| 6,216,449 B1 | | 4/2001 | Strehlau et al. | |
| 6,350,421 B1 | * | 2/2002 | Strehlau et al. | 423/213.2 |
| 6,375,910 B1 | * | 4/2002 | Deeba et al. | 423/239.1 |

FOREIGN PATENT DOCUMENTS

| | | |
|---|---|---|
| DE | 44 02 850 C2 | 8/1994 |
| DE | 198 16 175 A1 | 10/1999 |
| DE | 198 23 921 A1 | 12/1999 |
| DE | 198 44 178 A1 | 3/2000 |
| EP | 0 560 991 B1 | 9/1993 |

* cited by examiner

Primary Examiner—Thomas Denion
Assistant Examiner—Binh Tran
(74) Attorney, Agent, or Firm—Kalow & Springut LLP (57) ABSTRACT

The present invention provides processes for checking the operability of a nitrogen oxide storage catalyst during operation of a lean burn engine. The processes of the present invention utilize a nitrogen oxide storage material, a catalytically active component and optionally an oxygen storage material. During lean burn engine operation, damage to the catalytically active components is detected if the nitrogen oxide storage capacity in the kinetically controlled temperature range is lowered and damage to the storage material is detected if the nitrogen oxide storage capacity is lowered in the thermodynamically controlled temperature range.

14 Claims, 3 Drawing Sheets

PROCESS FOR CHECKING THE OPERATABILITY OF A NITROGEN OXIDE STORAGE CATALYST

INTRODUCTION AND BACKGROUND

The present invention relates to a process for checking the operatability of a nitrogen oxide storage catalyst which is used to remove the nitrogen oxides contained in the exhaust gas stream of a lean burn engine and contains at least a nitrogen oxide storage material, a catalytically active component and optionally an oxygen storage material, wherein the lean burn engine is operated with cyclic alternation of the air/fuel mixture from lean to rich and the nitrogen oxides contained in the exhaust gas are stored by the nitrogen oxide storage material in the presence of lean exhaust gas (storage phase) and desorbed and converted in the presence of rich exhaust gas (regeneration phase).

Nitrogen oxide storage catalysts were developed specifically for the treatment of exhaust gases from lean operated internal combustion engines. Diesel engines and lean burn gasoline engines belong to the group of lean operated internal combustion engines. Both types of engines are called lean burn engines in the following. Lean burn engines, in particular gasoline engines with a direct fuel injection system, are being used to an increasing extent in vehicle construction because they enable theoretical fuel savings of up to 25%, as compared with stoichiometrically operated internal combustion engines.

Nitrogen oxide storage catalysts have the ability to store nitrogen oxides over a wide temperature range under oxidizing exhaust gas conditions, that is during lean operation. This operating stage is therefore also called the storage phase in the following description.

Since the storage capacity of a storage catalyst is limited, it has to be regenerated from time to time. For this purpose, the air/fuel ratio in the air/fuel mixture supplied to the engine, and thus also the air/fuel ratio in the exhaust gas leaving the engine, is lowered to values of less than 1 for brief intervals. This process is also called enriching the air/fuel mixture of the exhaust gas. Thus, during this short operating phase, reducing conditions prevail in the exhaust gas prior to entry into the storage catalyst.

Under the reducing conditions present during the enrichment phase, the stored nitrogen oxides are released and reduced to nitrogen on the storage catalyst with simultaneous oxidation of carbon monoxide, hydrocarbons and hydrogen, as in the case of conventional three-way converters. This operating phase of the storage catalyst is also called the regeneration phase in the following. In the event of correct functioning of the total system consisting of storage catalyst, oxygen sensors and engine electronics, approximately stoichiometric conditions are present downstream of the storage catalyst during the regeneration phase, that is the hydrocarbons and carbon monoxide which are present in excess upstream of the storage catalyst during the regeneration phase are oxidized on the storage catalyst by the released nitrogen oxides. Only after completion of regeneration is there a sudden increase in reducing components downstream of the catalyst. This is called breakthrough of the reducing components through the storage catalyst.

The duration of the storage phase is typically about 30 to 100 seconds. The duration of the regeneration phase is substantially shorter and is in the region of only a few seconds (1 to 20 seconds).

The mode of operation and the composition of nitrogen oxide storage catalysts are known for example from EP 0 560 991 B1. As a storage material, these catalysts contain at least one component from the group of alkali metals (e.g. potassium, sodium, lithium, caesium), alkaline earth metals (e.g. barium, calcium) or rare earth metals (e.g. lanthanum, yttrium). As a catalytically active element, the storage catalyst contains platinum. Under oxidizing exhaust gas conditions, that is during lean operation, the storage materials can store the nitrogen oxides contained in the exhaust gas in the form of nitrates. For this purpose, however, the nitrogen oxides, about 60 to 95% of which consist of nitrogen monoxide, depending on the construction of the engine and its mode of operation, first have to be oxidized to nitrogen dioxide. This takes place on the platinum component of the storage catalyst.

In addition to the components mentioned above, the nitrogen oxide storage catalyst may also contain oxygen storing components. In this case, it can also take on the functions of a conventional three-way converter in addition to storing nitrogen oxides. Cerium oxide is mostly used as an oxygen storing component. The nitrogen oxide storage catalyst then has an oxygen storage function in addition to the nitrogen oxide storage function; thus it is bifunctional.

An important problem associated with modern exhaust gas treatment procedures is checking the correct functioning of the catalyst used in order to enable the timely replacement of catalysts which are no longer functioning efficiently. This also applies to nitrogen oxide storage catalysts, in which a variety of ageing mechanisms are observed. The nitrogen oxide storage capacity can be damaged on the one hand by the sulfur present in fuel and on the other hand by thermal stress. Whereas poisoning by sulfur can generally be counteracted by regenerating at elevated temperatures, thermal damage is an irreversible process.

In the case of bifunctional storage catalysts, in principle both storage functions (nitrogen oxide and oxygen) can be damaged by poisoning and by thermal effects. Damage to one function does not necessarily cause damage to the other function. Since nitrogen oxides and oxygen are both oxidizing components, their effects cannot be clearly separated from each other, so false diagnoses can be made when testing the catalyst.

DE 198 16 175 A1 discloses a process for checking the operatability of a nitrogen oxide storage catalyst which is intended to assess, separately, the oxygen storage function and nitrogen oxide storage function of the catalyst. To check the operatability of the storage catalyst in accordance with this document, the air/fuel ratio of the exhaust gas is switched from lean to rich and the time interval $\Delta t_1$ obtained between the first change over up to breakthrough of the rich exhaust gas through the catalyst and also the time interval $\Delta t_2$ obtained after switching the exhaust gas back from rich to lean, between the second change over up to breakthrough of oxygen through the catalyst, are measured. The time differences $\Delta t_1$ and $\Delta t_2$ permit separate assessment of the oxygen storage function and the nitrogen oxide storage function of the catalyst.

The nitrogen oxide storage function of the catalyst depends on the nitrogen oxide storage material and on the catalytically active component, generally platinum. Both the nitrogen oxide storage material and the catalytically active component may be damaged.

The nitrogen oxide storage material stores the sulfur dioxide contained in the exhaust gas in the form of sulfates. This takes place at the expense of the nitrogen oxide storage capacity. The sulfates in the storage material are substantially more stable than the nitrates. However, they can be decomposed again at exhaust gas temperatures higher than 600° C. and under reducing conditions. As a result of this desulfurization process, the nitrogen oxide storage material largely regains its original nitrogen oxide storage capacity.

The nitrogen oxide storage capacity of the storage material depends critically on the specific surface area with which it can interact with the exhaust gas. If the storage material is subjected to exhaust gas temperatures higher than about 800° C., the specific surface area becomes irreversibly reduced and its nitrogen oxide storage capacity decreases.

For optimum use of the catalytically active component, it is applied to the oxidic material of the storage catalyst in a highly dispersed form with average particle sizes between about 2 and 15 nm. Due to their very fine distribution, the platinum particles have a large surface area for interacting with the constituents in the exhaust gas. In particular in the lean exhaust gas of lean burn engines, irreversible enlargement, for example, of the platinum crystals is observed with increasing exhaust gas temperature and this is accompanied by an irreversible reduction in catalytic activity.

Using the process according to DE 198 16 175 A1 possible damage to the nitrogen oxide storage material and also to the catalytically active component are determined simultaneously. Assessment of damage to the storage material separately from damage to the catalytically active component is not possible using this process. Separate assessment of the catalytically active component is desirable, however, because a storage catalyst in which the component which is catalytically active towards the oxidation of nitrogen monoxide has been thermally damaged still has sufficient activity for exhaust gas treatment under stoichiometric exhaust gas conditions.

Thus, an object of the present invention is to provide a process which, in addition to assessing the storage materials in the storage catalyst, is also able to detect possible damage to the catalytically active component in the storage catalyst.

SUMMARY OF THE INVENTION

The above and other objects can be achieved by a process according to the invention for checking the operatability of a nitrogen oxide storage catalyst which is used for removing the nitrogen oxides contained in the exhaust gas stream of a lean burn engine and contains at least a nitrogen oxide storage material, a catalytically active component and optionally an oxygen storage material. According to the invention the lean burn engine is operated with cyclic alternation of the air/fuel mixture from lean to rich and the nitrogen oxides contained in the exhaust gas are stored by the nitrogen oxide storage material in the presence of lean exhaust gas (storage phase) and are desorbed and converted in the presence of rich exhaust gas (regeneration phase).

The process is characterized in that, to determine possible damage to the catalytically active component, the nitrogen oxide storage capacity of the nitrogen oxide storage catalyst is determined at exhaust gas temperatures which are within the range in which the oxidation of nitrogen monoxide to nitrogen dioxide is kinetically controlled, whereas no change in nitrogen oxide capacity is observed in the thermodynamically controlled range and, to determine possible damage to the storage material, the nitrogen oxide storage capacity of the nitrogen oxide storage catalyst is determined at exhaust gas temperatures which are within the range in which the oxidation of nitrogen monoxide to nitrogen dioxide is thermodynamically controlled.

When, in the context of this invention, the components in the storage catalyst are referred to in the singular, this is done in order to make the discussion easier to understand. A person skilled in the art will obviously understand that, in order to optimize the properties of the storage catalyst, different nitrogen oxide storage materials and also oxygen storage materials and several catalytically active components (for example, platinum, palladium, rhodium, iridium) may be combined with each other.

The process according to the invention is based on the ideas described below relating to the mode of action of nitrogen oxide storage catalysts.

According to the acknowledged theories of nitrogen oxide storage catalysts, the nitrogen oxides in the exhaust gas are bonded to the storage materials in the catalyst in the form of nitrates. However, only nitrogen dioxide reacts with the storage material to form the corresponding nitrates. Since about 60 to 95 vol. % of the nitrogen oxides in the exhaust gas from an internal combustion engine consists of nitrogen monoxide, this must first be oxidized to nitrogen dioxide on the catalytically active component in the storage catalyst before it can react with the storage material to form nitrates.

The nitrogen oxide storage capacity of a storage catalyst is thus determined by two processes:

a) oxidation of nitrogen monoxide on the catalytically active component in the storage catalyst to give nitrogen dioxide in accordance with the following equilibrium reaction equation:

$$2NO + O_2 \rightleftharpoons 2NO_2 \qquad (1)$$

b) reaction of nitrogen dioxide with the storage material to form the corresponding nitrates.

During the oxidation of nitrogen monoxide in an oxygen-containing atmosphere on the catalytically active component in accordance with reaction equation (1), a specific equilibrium is set up between nitrogen monoxide and oxygen on the one side and nitrogen dioxide on the other side, this depending on the particular temperature. Above a temperature of about 300° C., the equilibrium being set up corresponds to the thermodynamic equilibrium, that is the equilibrium is shifted to the left with increasing temperature due to the highly exothermic nature of the formation of nitrogen dioxide from nitrogen monoxide and oxygen. Above about 650° C., nitrogen monoxide reacts with oxygen to form nitrogen dioxide to only a very small extent. Below 300° C. the thermodynamic equilibrium in accordance with reaction equation (1) shifts to the right with decreasing temperature, that is the formation of nitrogen dioxide is thermodynamically favoured in this temperature range. Nevertheless, the formation of nitrogen dioxide decreases again below about 300° C. due to kinetic restrictions and is negligible below 100° C. The temperature limit of about 300° C. mentioned here applies to an oxygen content in the gas mixture of 6 vol. %.

When performing the process in a practical situation, measurements are made in the kinetically controlled range below 300° C. and in the thermodynamically controlled range, preferably between 350 and 450° C.

The nitrogen oxide storage capacity of the catalyst in the kinetically controlled temperature range is strongly dependent on the available surface area of the platinum particles. The larger the platinum surface area, the smaller is the effect of kinetic restrictions on the formation of the thermodynamically favoured nitrogen dioxide. In contrast, the platinum surface area plays only a much smaller part in the thermodynamically controlled range for the formation of nitrogen dioxide. The critical factor for nitrogen oxide storage capacity in this range is rapid removal of the nitrogen dioxide formed from the equilibrium in accordance with reaction equation (1), as a result of reaction with the storage material to form nitrates, which then leads to fresh production of nitrogen dioxide in accordance with the equilibrium. The formation of nitrate is dependent on possible damage to the storage material by thermal effects or by sulfur poisoning.

Thus, by checking the nitrogen oxide storage capacity of the catalyst in both temperature ranges (kinetically controlled range and thermodynamically controlled range for the formation of nitrogen dioxide) it is possible to differentiate damage to the catalytically active component from damage to the storage material.

BRIEF DESCRIPTION OF DRAWINGS

The invention is now explained in more detail with reference to FIGS. 1 to 6, wherein.

DETAILED DESCRIPTION OF INVENTION

To check the nitrogen oxide storage capacity, various types of sensors are used. Either nitrogen oxide sensors or lambda linear sensors, lambda jump sensors, hydrocarbon sensors, carbon monoxide sensors or hydrogen sensors may be used. Furthermore, it is possible to determine the nitrogen oxide storage capacity by means of the change in a physical property of the storage catalyst which depends on the amount of stored nitrogen oxides. The complex electrical impedance of the catalyst is particularly suitable for this purpose. A process for determining the nitrogen oxide storage capacity of a storage catalyst by means of its complex electrical impedance is described, for example, in EP 0 936 348 A2.

A nitrogen oxide sensor is able to measure directly the nitrogen oxide concentration in the exhaust gas. Due to their structure, currently available nitrogen oxide sensors also simultaneously produce a linear and a jump-type signal for the oxygen content of the exhaust gas (lambda signal).

A lambda linear sensor provides a sensor signal which rises linearly with the oxygen content of the exhaust gas. A lambda jump sensor, however, provides a sensor voltage which has only two states. On exceeding or undershooting a threshold value for the oxygen concentration in the exhaust gas the sensor voltage jumps from one state to the other. Under lean conditions, the sensor voltage is virtually zero. Under rich conditions, the sensor shows an output voltage which is typically between 700 and 900 mV. The sensor voltage has a steep gradient in the transition region around lambda=1. With the aid of this type of sensor, breakthrough of the rich exhaust gas at the end of the regeneration phase can easily be detected. The modes of operation of lambda sensors which are suitable for the process are described in Kraftfahrttechnischen Taschenbuch from Bosch, VDI-Verlag, 20th edition dated 1995, pages 490 to 492.

Hydrocarbon, carbon monoxide and hydrogen sensors may also be used to determine the nitrogen oxide storage capacity. These types of sensors are currently under development and have not yet reached full production status. Breakthrough of the rich exhaust gas through the catalyst at the end of the regeneration phase can also be determined using these sensors.

When using a nitrogen oxide sensor, it is possible to determine the nitrogen oxide storage capacity of the storage catalyst directly. To do this, the nitrogen oxide sensor is arranged in the exhaust gas downstream of the storage catalyst. When the concentration of nitrogen oxides in the exhaust gas downstream of catalyst exceeds a predetermined threshold value during the storage phase, regeneration is triggered by the engine management system. From the engine mapping filed in the engine management system, it is possible to calculate the amount of nitrogen oxides emitted theoretically by the engine (raw emission) up to this time by integrating over the operating conditions of the engine which have been passed through and to compare this value with the storage capacity of the catalyst in the freshly prepared state. If the raw emission of nitrogen oxides up to the point of achieving the threshold value is substantially less than the storage capacity of the fresh catalyst, then there is damage to the storage capacity. The interval of time from the start of a storage phase up to achieving the threshold value for regeneration is called $\Delta t_s$ in the following.

By choosing the temperature range in which the measurement is made, the types of damage can be differentiated. Damage to the catalytically active component has taken place if, in the kinetically controlled range, with exhaust gas temperatures below 300° C., a reduction in the nitrogen oxide storage capacity is detected, while no change in nitrogen oxide storage capacity is detected in the thermodynamically controlled range above 300° C., preferably in the temperature range 350–450° C.

Determination of possible damage to the storage material takes place at exhaust gas temperatures above 300° C., preferably in the temperature range 350–450° C. If damage is detected in this way, it may be due to sulfurization or may comprise thermal damage to the storage material. In the first case there is reversible damage which can be remedied by desulfurization of the storage material, while in the second case the damage is permanent. To differentiate between these two damage mechanisms, therefore, desulfatization of the nitrogen oxide storage catalyst is initiated after detecting damage to the storage material.

With lambda sensors, hydrocarbon, carbon monoxide and hydrogen sensors, the nitrogen oxide storage capacity can be determined only indirectly during the regeneration phase. These sensors are used to measure the time interval $\Delta t_1$ between switching over the air/fuel mixture from lean to rich and breakthrough of the rich exhaust gas through the nitrogen oxide storage catalyst. This time difference is caused by the action of the nitrogen oxide storage material and by the optionally present oxygen storage material in the catalyst. The time difference is shorter the lower the storage capacity of the catalyst for nitrogen oxides and optionally for oxygen.

If the nitrogen oxide storage capacity and the oxygen storage capacity of the catalyst are to be assessed separately from each other, then, after again switching the air/fuel mixture from rich to lean, the time interval $\Delta t_2$ obtained between the second switch-over and breakthrough of the oxygen through the catalyst has to be measured. This time interval is dependent only on the oxygen storage capacity of the catalyst.

After switching the air/fuel ratio from lean to rich, the nitrogen oxides are desorbed by the reductive components in the exhaust gas (hydrocarbons, carbon monoxide and hydrogen) and converted on the storage catalyst. In addition, the reductive components in the exhaust gas are oxidized with consumption of the stored oxygen. The nitrogen oxide storage material and the oxygen storage material are thus emptied out by rich exhaust gas.

The air/fuel ratio of the exhaust gas downstream of the catalyst does not instantly follow the change in air/fuel ratio upstream of the catalyst, but only after a certain delay and remains in the lean range for as long as the storage materials are not emptied out, so that a sensor located downstream of the catalyst would still indicate a lean exhaust gas composition. Only when the nitrogen oxide storage material and the oxygen storage material have been emptied out are hydrocarbons, carbon monoxide and hydrogen no longer converted. These substances then breakthrough the catalyst and the air/fuel ratio in the exhaust gas downstream of the catalyst changes into the rich range. This time can be determined in a simple manner using the sensors mentioned above.

The stored nitrogen oxides are generally released more rapidly than the oxygen stored on the catalyst is consumed by the hydrocarbons, or emptied out, in a rich exhaust gas. In addition, these rates of desorption are also dependent on the degree of enrichment of the exhaust gas and the exhaust gas temperature. The more the exhaust gas is enriched, the more rapidly are the nitrogen oxide storage material and oxygen storage material emptied out. The same applies to an increase in exhaust gas temperature. The air/fuel ratio during the rich phase may be within an interval between 0.7 and 0.99 for the process according to the invention.

If an air/fuel ratio of just under 1 is chosen, then the store is emptied more slowly than when the air/fuel ratio has a lower value. This enables higher accuracy for the time measurement. Breakthrough of the reductive components through the catalyst takes place, in this case, only after complete emptying of the nitrogen oxide storage material and of the oxygen storage material, so the time difference being measured reflects the sum of the two storage capacities.

Checking the catalyst is preferably performed for a specific operating state of the engine, that is with a defined exhaust gas temperature and air/fuel ratio during the rich phase, or regeneration phase.

Emptying the nitrogen oxide and oxygen storage materials on switching the air/fuel ratio from lean to rich means that corresponding filling up of the oxygen store has to take place after completing the rich phase. As already described for switching from lean to rich, then also when switching from rich to lean the air/fuel ratio downstream of the catalyst does not instantly follow the air/fuel ratio upstream of the catalyst. The air/fuel ratio initially remains in the rich range because the oxygen excess in the lean exhaust gas is first used to fill up the oxygen store. Furthermore, a lambda jump sensor located downstream of the catalyst would thus indicate a rich exhaust gas. Only after the oxygen store has been filled up is there a marked breakthrough of oxygen through the catalyst and also, in the event that the measurements are made using a jump sensor, to a jump in the sensor signal. The measurable time difference $\Delta t_2$ between the end of the rich phase and breakthrough of oxygen through the catalyst is a measure of the storage capacity of the oxygen store. If the oxygen storage capacity of the catalyst falls due to poisoning with sulfur or to thermal damage, then this is observed as a reduction in $\Delta t_2$ and this can optionally be used as a signal to change the catalyst.

For separate assessment of the nitrogen oxide storage capacity and oxygen storage capacity, the following relationships for $\Delta t_1$ and $\Delta t_2$ can be used:

$$\Delta t_1 = a \cdot K_{NOx} + b \cdot K_{O2} \qquad (2)$$

Here, a and b are proportionality constants. $K_{NOx}$ and $K_{O2}$ denote the storage capacities for nitrogen oxides and oxygen.

Equation (2) reproduces the finding that $\Delta t_1$ is affected by both storage capacities. It can clearly be seen that the effects of the two storage capacities cannot be separated from each other by measuring only $\Delta t_1$. Therefore, the determination of $\Delta t_2$ is used as a further measurement. $\Delta t_2$ is dependent only on the oxygen storage capacity:

$$\Delta t_2 = c \cdot K_{O2} \qquad (3)$$

Proportionality constant b describes the rate of emptying of the oxygen store, whereas the constant c is a measure of the rate at which the oxygen store is filled up again. From equations (2) and (3), the capacity of the nitrogen oxide store is:

$$a \cdot K_{NOx} = \Delta t_1 + \frac{b}{c} \cdot \Delta t_2 \qquad (4)$$

The ratio b/c in equation (4) depends on the material and the operating conditions chosen for the engine during catalyst testing. It may be determined in preliminary trials. Equations (2) and (3) thus also enable, in the case of the simultaneous presence of a nitrogen oxide storage function and an oxygen storage function in the storage catalyst, separate assessment of both functions by measurement of $\Delta t_1$ and $\Delta t_2$.

The time differences $\Delta t_1$ and $\Delta t_2$ may be determined in a variety of ways. Thus, there is the possibility of determining time differences $\Delta t_1$ and $\Delta t_2$ from the difference between the actual time of switching over the air/fuel ratio by the engine management system and the actual time the air/fuel ratio changes downstream of the catalyst. If there is a long exhaust gas pipe between the engine and the storage catalyst, then the time differences determined in this way must optionally be corrected by the time of passage between the engine and the catalyst. Alternatively, changes in the air/fuel ratio upstream and downstream of the catalyst can be measured, using one sensor for each, in order to determine the time differences.

Table 1 gives an overview of the possibilities produced by the process according to the invention for assessing the nitrogen oxide storage catalyst when using different sensors. Two groups of sensors may be differentiated.

The duration of the storage phase $\Delta t_s$ can be measured with a nitrogen oxide sensor or a property sensor for a physical property of the storage catalyst. The measurement may be made either in the kinetically (kin) or in the thermodynamically (therm) controlled temperature range. If a reduction in $\Delta t_s$ is detected in the kinetically controlled range ($\downarrow$), then this may have been caused by the damage mechanisms specified in the left-hand column of the table. Detection of irreversible damage to the oxygen storage material is not possible using this measurement (no detectable change as compared with the previous state of the catalyst, ○). If a control measurement in the thermodynamically controlled region shows no change in $\Delta t_s$ as compared with the previous measurement in this region, then there is some damage to the catalytically active component.

Further differentiation of the damage mechanism is possible when, after finding damage, desulfurization of the storage catalyst is performed. For this, the exhaust gas temperature of rich exhaust gas is increased to more than 650° C. The duration of the storage phase measured after desulfurization is called $\Delta t_{s,DeSOX}$ in table 1. If this time is no different from $\Delta t_s$, then there is irreversible damage to the nitrogen oxide storage material and to the optionally present oxygen storage material. If, however, $\Delta t_{s,DeSOX}$ is greater than $\Delta t_s$, that is the damage could be repaired by desulfurisation, then there is only reversible poisoning of the nitrogen oxide storage material and optionally of the oxygen storage material.

The time intervals defined above, $\Delta t_1$ and $\Delta t_2$ can be measured with an oxygen, hydrogen, hydrocarbon or carbon monoxide sensor. $\Delta t_{1,DeSOX}$ and $\Delta t_{2,DeSOX}$ in table 1 denote the time intervals $\Delta t_1$ and $\Delta t_2$ after desulfurization has been performed. In accordance with the explanations given above relating to measurements with a nitrogen oxide or property sensor, the possibilities available for differentiating the various damage mechanisms in the storage catalyst are listed in table 1.

TABLE 1

| Diagnosis by type of sensor | Nitrogen oxide sensor Status sensor | | | | Oxygen sensor (lambda sensor) Hydrogen, hydrocarbon, carbon monoxide sensor | | | | | | | |
|---|---|---|---|---|---|---|---|---|---|---|---|---|
| | $Dt_s$ | | $Dt_{s,DeSOx}$ | | $Dt_1$ | | $Dt_2$ | | $Dt_{1,DeSOx}$ | | $Dt_{2,DeSOx}$ | |
| | kin | therm | kin | therm | kin | therm | kin | therm | kin | therm | kin | therm |
| Thermal damage to catalytically active component | ↓ | ○ | ○ | ○ | ↓ | ○ | ○ | ○ | ○ | ○ | ○ | ○ |
| Irreversible damage to nitrogen oxide storage material | ↓ | ↓ | ○ | ○ | ↓ | ↓ | ○ | ○ | ○ | ○ | ○ | ○ |
| Irreversible damage to oxygen storage material | ○ | ○ | ○ | ○ | ↓ | ↓ | ↓ | ↓ | ○ | ○ | ○ | ○ |
| Irreversible damage to nitrogen oxide and oxygen storage material | ↓ | ↓ | ○ | ○ | ↓↓ | ↓↓ | ↓ | ↓ | ○ | ○ | ○ | ○ |
| Reversible poisoning of nitrogen oxide storage material | ↓ | ↓ | ↑ | ↑ | ↓ | ↓ | ○ | ○ | ↑ | ↑ | ○ | ○ |
| Reversible poisoning of nitrogen oxide and oxygen storage material | ↓ | ↓ | ↑ | ↑ | ↓↓ | ↓↓ | ↓ | ↓ | ↑↑ | ↑↑ | ↑ | ↑ |

$\Delta t_s$ = Duration of lean phase
$\Delta t_{s,DeSOx}$ = Duration of lean phase after desulfurisation
$t_1$ = Time difference between initiating the rich phase and breakthrough of a rich exhaust gas
$t_2$ = Time difference between initiating the lean phase and breakthrough of an oxygen-rich exhaust gas
$\Delta t_{1,DeSOx}$ = Time difference between initiating the rich phase and breakthrough of a rich exhaust gas
$\Delta t_{2,DeSOx}$ = Time difference between initiating the lean phase and breakthrough of a oxygen-rich exhaust gas after desulfurisation
kin = Kinetically controlled temperature range with respect to oxidation of NO
therm = Thermodynamically controlled temperature range with respect to oxidation of NO
↓ = Reduction in time interval relative to previous state
↑ = Increase in time interval relative to previous state
○ = No change in time interval relative to previous state

EXAMPLE 1

The equilibrium concentration of nitrogen dioxide being produced during the oxidation of nitrogen monoxide on an oxidation catalyst was measured at different gas temperatures and compared with the thermodynamically calculated equilibrium concentration.

A pure platinum/aluminium oxide oxidation catalyst was made up for these measurements. 15 g of platinum were deposited onto 700 g of aluminium oxide with a BET surface area in the calcined, freshly prepared state of 210 m$^2$/g by impregnating with an aqueous solution of platinum tetraamminenitrate and then drying and calcining at 500°C. in air.

The catalyst powder prepared in this way was stirred up to give an aqueous dispersion and milled to a particle size of 3–5 μm ($d_{50}$). A commercially available honeycomb structure made of cordierite was coated with this dispersion by immersion in the dispersion.

The coated honeycomb structure was dried at 120° C. in a drying cabinet. The immersion and drying steps were repeated until a coating of 110 g per liter of honeycomb structure volume, in the dry state, was achieved. Then the coated honeycomb structure was calcined at 500° C. for 4 hours. The final catalyst then contained 107.7 g/l of aluminium oxide and 2.3 g/l of platinum.

A gas mixture of 500 vol.ppm of nitrogen monoxide, 6 vol. % of oxygen with the remainder being nitrogen, was passed over the catalyst at temperatures between 50 and 500° C. at a space velocity of 30000 h$^{-1}$. The equilibrium concentrations of nitrogen dioxide measured downstream of the catalyst are plotted against temperature in FIG. 1 and compared with the thermodynamically calculated values.

Figure 1:
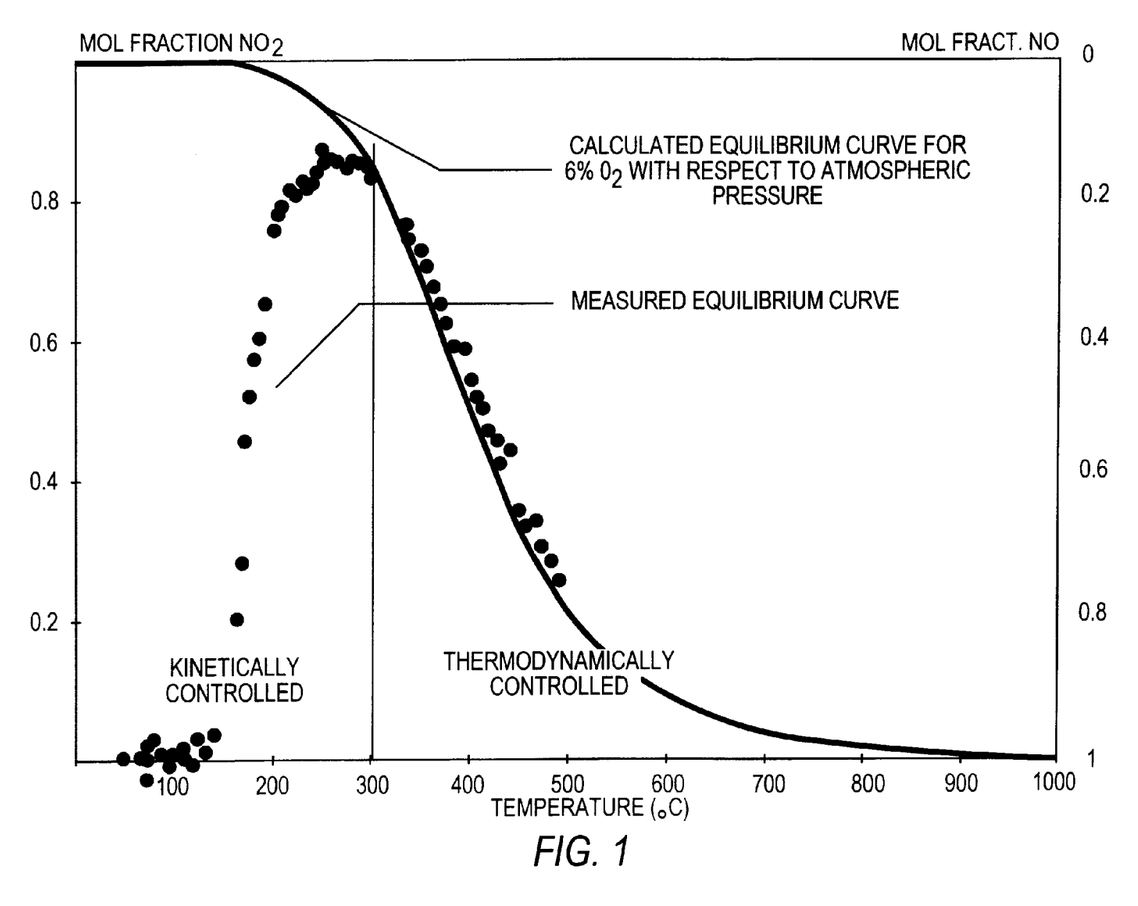
FIG. 1 is a graph measurements of the oxidation equilibrium in accordance with reaction equation(1)

At temperatures above about 300° C., the measured equilibrium values agree very well with the values calculated for 6 vol. % oxygen. At temperatures below 300° C. the measured equilibrium concentration decreases down to zero with decreasing temperature due to kinetic restrictions on the reaction, while the calculated equilibrium concentration at low temperatures tends to 1.

EXAMPLE 2

A nitrogen oxide storage catalyst in accordance with example 1 in DE 198 38 282 A1 containing platinum and rhodium as catalytically active components and barium oxide as storage material was prepared from three powdered materials as follows:

550 g of a cerium/zirconium mixed oxide (90 wt. % cerium oxide and 10 wt. % zirconium oxide) with a BET surface area in the calcined, freshly prepared state of 87 m$^2$/g were coated with 100 g of barium oxide by impregnating with aqueous barium acetate solution and then drying and calcining at 500° C. in air. Soluble barium acetate was fixed onto the support material in the form of barium oxide or barium carbonate by calcining. This ensured that the barium acetate did not go back into solution during the subsequent stages of preparation.

To make up a platinum/aluminum oxide powder, 15 g of platinum were deposited onto 700 g of aluminum oxide with a BET surface area in the calcined, freshly prepared state of 210 m$^2$/g by impregnating with an aqueous solution of platinum tetraamminenitrate and then drying and calcining at 500° C. in air.

To make up a rhodium/aluminium oxide powder, 1.5 g of rhodium were deposited onto 100 g of aluminium oxide with a BET surface area, in the calcined, freshly prepared state of 142 m$^2$/g by impregnating with an aqueous rhodium nitrate solution and then drying and calcining at 500° C.

The three powders prepared in this way were stirred up to give an aqueous dispersion and milled to a particle size of 3–5 μm ($d_{50}$). The oxidic solids present in the dispersion were applied to a commercially available honeycomb structure made of cordierite using an immersion procedure.

The honeycomb structures coated in this way were dried at 120° C. in a drying cabinet. The immersion and drying stages were repeated until a coating of 230 g per liter of oxidic components per liter of honeycomb structure volume was achieved. The coated honeycomb structures were then calcined for 4 hours at 500° C. The final catalyst thus contained 15.9 g/l of barium oxide, 87.2 g/l of cerium/zirconium mixed oxide, 126.9 g/l of aluminum oxide, 2.4 g/l of platinum and 0.24 g/l of rhodium.

The nitrogen oxide storage capacity of this nitrogen oxide storage catalyst was determined in a synthesis gas unit in the freshly prepared state and after different ageing procedures, as a function of exhaust gas temperature. The gas compositions during the storage phase (lean phase) and during the regeneration phase (rich phase) are given in table 2. The nitrogen oxide storage capacity SNO was determined as $$S_{NO} = \frac{M_{NO,in} - M_{NO,out}}{M_{NO,in}} \cdot 100[\%]. \quad (5)$$

Here, $M_{NO,in}$ represents the weight of nitrogen monoxide passed over the catalyst during the storage phases and $M_{NO,out}$ represents the weight of nitrogen monoxide emerging from the catalyst during the storage phases. The nitrogen oxide storage capacity was averaged over 8 lean/rich cycles each time.

TABLE 2

Gas composition during lean and rich phases

| Gas component | | Lean phase | Rich phase |
|---|---|---|---|
| CO | [vol. %] | 0 | 4 |
| H$_2$ | [vol. %] | 0 | 1.3 |
| O$_2$ | [vol. %] | 8 | 0 |
| C$_3$H$_8$ | [vol. ppm] | 17 | |
| C$_3$H$_6$ | [vol. ppm] | 33 | |
| NO | [vol. ppm] | 500 | |
| CO$_2$ | [vol. %] | 10 | |
| H$_2$O | [vol. %] | 10 | |
| N$_2$ | | Balance | |
| SV | [h$^{-1}$] | 30000 | |
| T | [° C.] | 250, 350, 450, 500 | |
| Lambda | | 1.5 | 0.88 |
| Duration [s] | | 80 | 2 |

Space Velocity

In addition to the fresh state, the nitrogen oxide storage capacity of the catalysts was checked after two different ageing processes:
a) Thermal damage to the catalytically active component in the storage catalyst by thermal ageing in air at a temperature of 850° C. for a period of 24 hours.
b) Reversible sulfur poisoning of the storage material in a lean engine at an exhaust gas temperature of 350° C. for a period of 8 hours. The lean engine was operated with a fuel which contained 189 wt.ppm of sulfur. Each storage phase lasted for 60 s with a normalized air/fuel ratio of 1.4. Each regeneration phase lasted for 5 s with a normalized air/fuel ratio of 0.75. During the eight hour sulfurisation procedure, the catalyst stored 3 g of sulfur in the form of sulfates.

Figure 2:
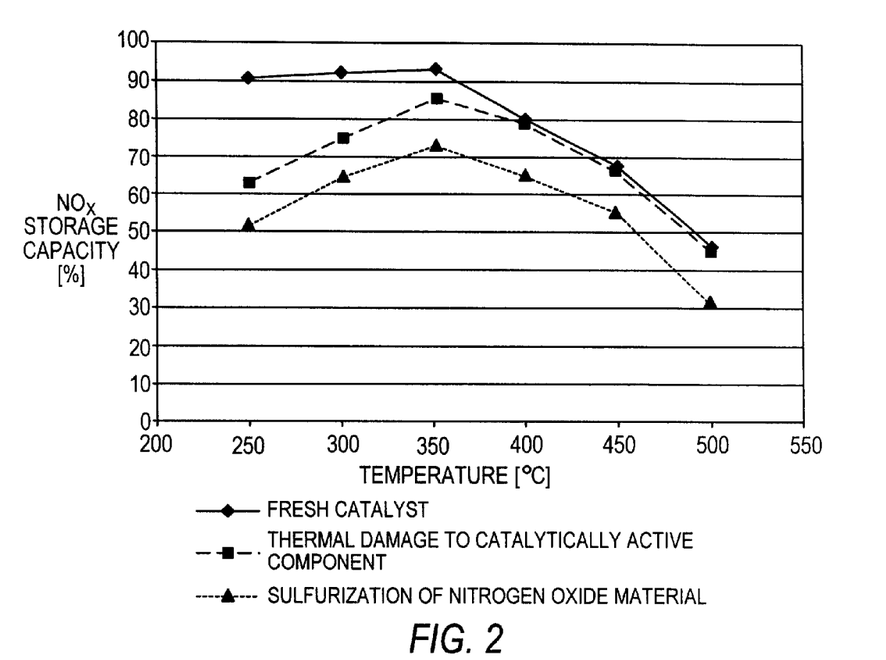
FIG. 2 is a graph of nitrogen oxide storage capacity of a storage catalyst in the freshly prepared state and after various types of damage as a function of temperature.

FIG. 2 shows the nitrogen oxide storage capacities of the catalyst as a function of the temperature of the synthesis gas. Thermal damage to the nitrogen oxide storage material is expressed as a steep decrease in the nitrogen oxide storage capacity at temperatures below 350° C. At higher temperatures, damage to the catalytically active component does not have a substantial effect on the nitrogen oxide storage capacity. However, sulfurization of the nitrogen oxide storage material causes a decrease in the nitrogen oxide storage capacity over the entire temperature range between 250 and 500° C.

Figure 3:
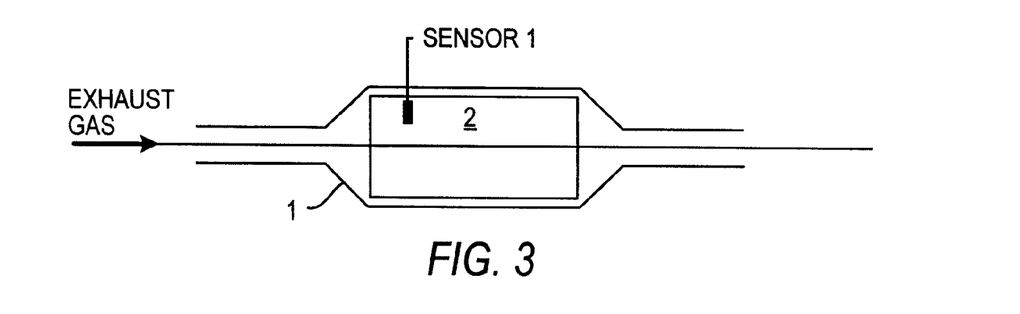
FIG. 3 is a schematic representation of an exhaust gas treatment unit with a sensor for a physical property of the storage catalyst.
Figure 4:
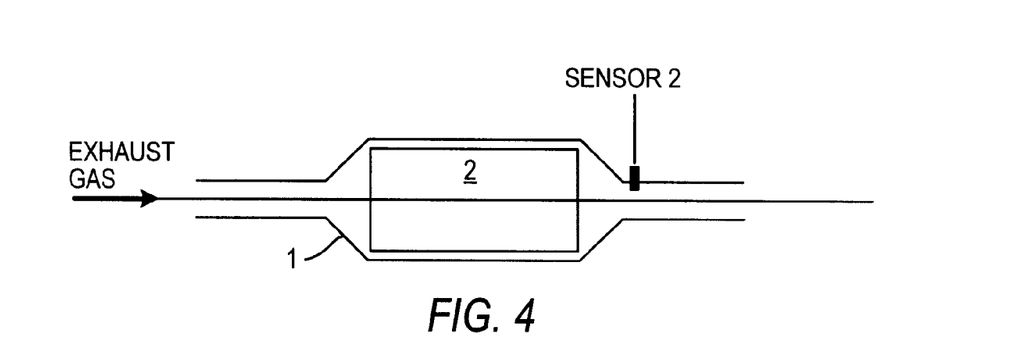
FIG. 4 is a schematic representation of an exhaust gas treatment unit with a nitrogen oxide sensor downstream of the storage catalyst.
Figure 5:
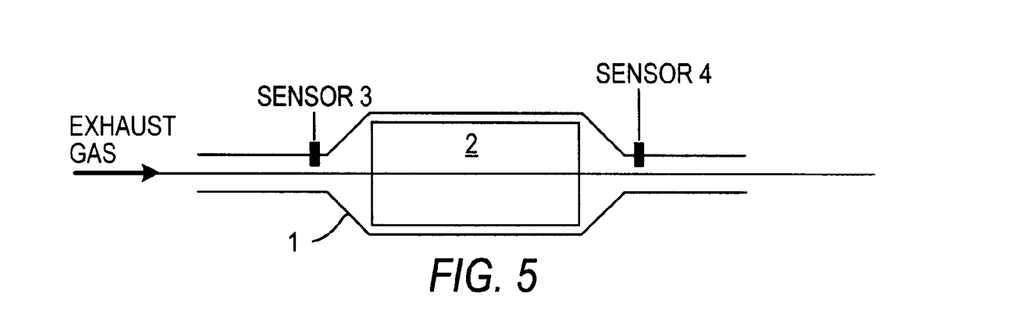
FIG. 5 is a schematic representation of an exhaust gas treatment unit with a lambda jump sensor upstream and downstream of the storage catalyst.

FIGS. 3 to 5 show an exhaust gas treatment unit (1) with different sensor configurations for performing the process according to invention in accordance with the data in table 1. (2) denotes the storage catalyst, the function of which is regularly to be tested. It is built into a housing in the exhaust gas treatment unit. In FIG. 3, sensor 1 is a sensor which measures a physical property of the catalyst such as, for example, the complex electrical impedance. The position of sensor 1 in FIG. 3 is shown by way of example and it may be mounted radially and axially, when used, over the entire catalyst or at several points in the catalyst. FIG. 4 shows an arrangement with a nitrogen oxide sensor (sensor 2) downstream of the catalyst, while FIG. 5 shows an arrangement with, for example, two lambda jump sensors, one of which is located upstream of the catalyst and one downstream of the catalyst. Instead of lambda jump sensors, lambda linear sensors, hydrogen sensors, hydrocarbon sensors and carbon monoxide sensors may be used in this arrangement. With the aid of sensors, the time intervals $\Delta t_1$ and $\Delta t_2$ are measured. In this case, the particular sensor located upstream of the catalyst is used to determine the time at which the air/fuel ratio is switched over from lean to rich and/or from rich to lean. The sensor upstream of the catalyst is not required when the switch-over time is provided by the engine management system.

Figure 6:
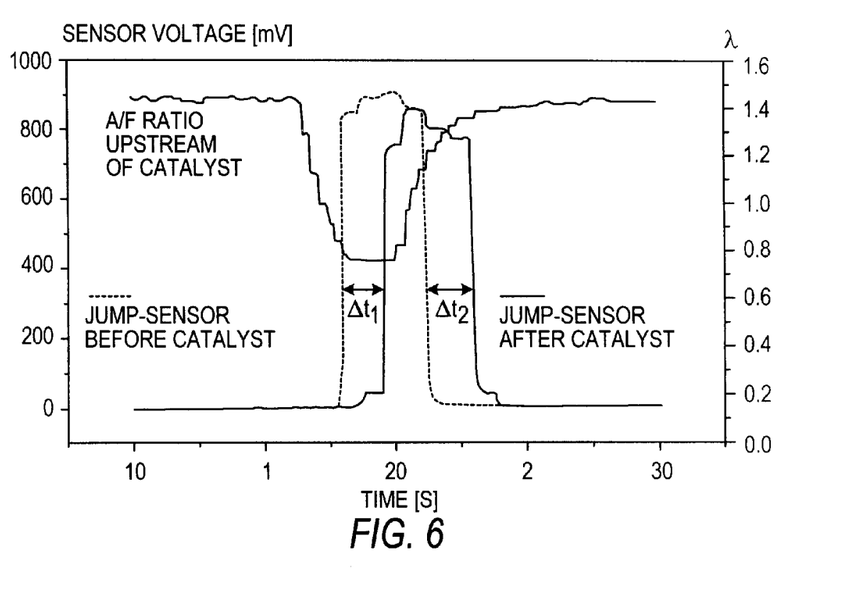
FIG. 6 is a schematic representation of an change with time of the normalized air/fuel ratio δ upstream of the storage catalyst and the change in signal of the lambda jump sensors in FIG. 5 while checking the catalyst function.

FIG. 6 shows the change in air/fuel ratio initiated by the engine electronics system, measured by a lambda linear sensor upstream of the storage catalyst and also the sensor voltages of jump sensor 3 upstream of the catalyst and jump sensor 4 downstream of the catalyst.

The air/fuel ratio has a value greater than 1 (here 1.4) during most of the time of operation. In this lean operating phase, nitrogen oxides are stored on the catalyst by the nitrogen oxide storage function in the catalyst and oxygen is stored on the catalyst by the oxygen storage function in the catalyst.

After a certain length of time, the nitrogen oxide store in the catalyst is full and it has to be regenerated. For this, the air/fuel ratio is lowered to a value of less than 1 (here 0.75) by the engine management system. Accordingly, the signal from sensor 3 upstream of the catalyst alters. As a result of the presence of a now reducing exhaust gas, the nitrogen oxides stored on the storage catalyst are decomposed and desorbed and the oxygen stored on the catalyst is consumed to oxidize the reductive constituents in the exhaust gas. Only after regeneration of the storage materials is there a breakthrough of the rich exhaust gas through the catalyst and this then leads to a corresponding rise in the signal from sensor 4.

The two front edges of the sensor signals show the time interval $\Delta t_1$, which is caused by the nitrogen oxide storage capacity and optionally the oxygen storage capacity of the catalyst. The more seriously the storage functions are damaged, the shorter is the time interval $\Delta t_1$.

After completion of the regeneration phase, the air/fuel ratio is raised again to a value greater than 1 which results in the sensor voltage for sensor 3 jumping back to zero. Sensor 4, however, still indicates, for a certain period, a sub-stoichiometric air/fuel ratio downstream of the catalyst because the oxygen in the lean exhaust gas is first used to fill up the oxygen store in the catalyst before it can pass unhindered through the catalyst and the signal from sensor 4 can return to its original status. As a result there is a time interval $\Delta t_2$ between the two rear edges of the sensor signals.

As demonstrated by these considerations, the time interval $\Delta t_2$ depends only on the oxygen storage capacity of the catalyst. Therefore, by measuring this time, an assessment of the condition of the oxygen storage function of the catalyst can be made. The smaller is $\Delta t_2$, the smaller is the oxygen storage capacity of the catalyst still remaining.

Further variations and modifications of the foregoing will be apparent to those skilled in the art and are intended to be encompassed by the claims appended hereto.

German priority application 100 17 940.1 is relied on and incorporated herein by reference.

We claim:

1. A process for checking the operability of a nitrogen oxide storage catalyst which is used to remove the nitrogen oxides contained in the exhaust gas stream from a lean burn engine and which contains at least a nitrogen oxide storage material, a catalytically active component and optionally an oxygen storage material, wherein the lean burn engine is operated with cyclic alternation of the air/fuel mixture from lean to rich and the nitrogen oxides contained in the exhaust gas are stored by the nitrogen oxide storage material in the presence of lean exhaust gas in the storage phase and is desorbed and converted in the presence of rich exhaust gas in the regeneration phase comprising:

determining the nitrogen oxide storage capacity of the nitrogen oxide storage catalyst at the exhaust gas temperatures which are within the range in which the oxidation of nitrogen monoxide to nitrogen dioxide is kinetically controlled, and at exhaust gas temperatures which are within the range in which the oxidation of nitrogen monoxide to nitrogen dioxide is thermodynamically controlled and, wherein damage to the catalytically active components is detected if the nitrogen oxide storage capacity in the kinetically controlled temperature range is lowered while no change of the nitrogen oxide storage capacity in the thermodynamically controlled temperature range is detected, and damage to the storage materials is detected if the nitrogen oxide storage capacity is lowered in the thermodynamically controlled temperature range.

2. The process according to claim 1, wherein the nitrogen oxide storage capacity in the kinetically controlled temperature range is determined at temperatures below 300° C. while the nitrogen oxide storage capacity in the thermodynamically controlled temperature range is determined at temperatures above 300° C.

3. The process according to claim 2, wherein the nitrogen oxide storage capacity in the thermodynamically controlled temperature range is determined at temperatures between 350 and 450° C.

4. The process according to claim 1, wherein the nitrogen oxide storage capacity is determined during the storage phase by a nitrogen oxide sensor located in the exhaust gas stream downstream of the nitrogen oxide storage catalyst.

5. The process according to claim 1, wherein the nitrogen oxide storage capacity is measured during the regeneration phase with the aid of a linear lambda sensor, a jump lambda sensor, a hydrocarbon sensor, a carbon monoxide sensor or a hydrogen sensor by measuring the time interval $\Delta t_1$ between switching over the air/fuel mixture from lean to rich and breakthrough of the rich exhaust gas through the nitrogen oxide storage catalyst.

6. The process according to claim 1, wherein the nitrogen oxide storage capacity is determined by the change in a physical property of the storage catalyst which depends on the amount of stored nitrogen oxides.

7. The process according to claim 6, wherein the change in the complex electrical impedance of the catalyst is measured.

8. The process according to claim 1, wherein after finding the damage to the nitrogen oxide storage material, desulfatization of the nitrogen oxide storage catalyst is initiated.

9. A process for determining the operability of a nitrogen oxide storage catalyst which removes nitrogen oxides contained in an exhaust gas stream from a lean burn engine, comprising:

determining nitrogen oxide storage capacity for the nitrogen oxide storage catalyst when the lean burn engine is operated where oxidation of nitrogen monoxide to nitrogen dioxide is at a temperature range that is kinetically controlled and at a temperature that is thermodynamically controlled; the nitrogen oxide storage catalyst comprising a nitrogen oxide storage material and a catalytically active component;

detecting damage to the catalytically active component when the nitrogen oxide storage capacity is lowered at the kinetically controlled temperature range; and detecting damage to the nitrogen oxide storage material when the nitrogen oxide storage capacity is lowered at the thermodynamically controlled temperature range, thereby determining the operability of the nitrogen oxide storage catalyst.

10. The process according to claim 9, wherein the nitrogen oxide storage capacity in the kinetically controlled temperature range is determined at temperatures below 300° C.

11. The process according to claim 9, wherein the nitrogen oxide storage capacity in the thermodynamically controlled temperature range is determined at temperatures above 300° C.

12. The process according to claim 9, wherein the nitrogen oxide storage capacity in the thermodynamically controlled temperature range is determined at temperatures between 350 and 450° C.

13. The process according to claim 9, wherein after detecting damage to the nitrogen oxide storage material, desulfatization of the nitrogen oxide storage catalyst is initiated.

14. The process according to claim 9, wherein the nitrogen oxide storage catalyst further comprises an oxygen storage material.

* * * * *